July 30, 1940.                L. L. SCHAUER                2,209,939
              AUTOMATICALLY-CONTROLLED GRAVITY OILER
                  Filed July 26, 1938         4 Sheets-Sheet 1

INVENTOR
Lawrence L. Schauer
BY
Albert F. Nathan
ATTORNEY

July 30, 1940.   L. L. SCHAUER   2,209,939
AUTOMATICALLY-CONTROLLED GRAVITY OILER
Filed July 26, 1938   4 Sheets-Sheet 2
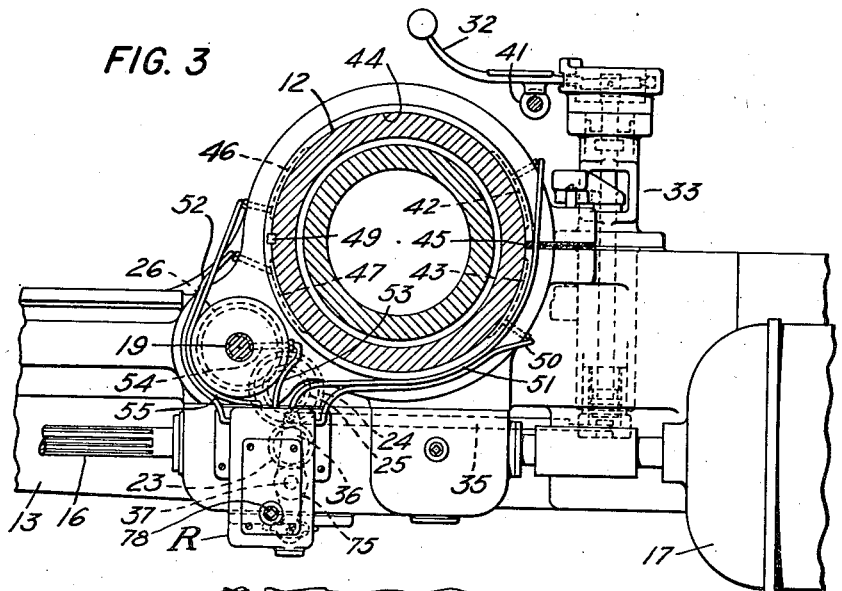
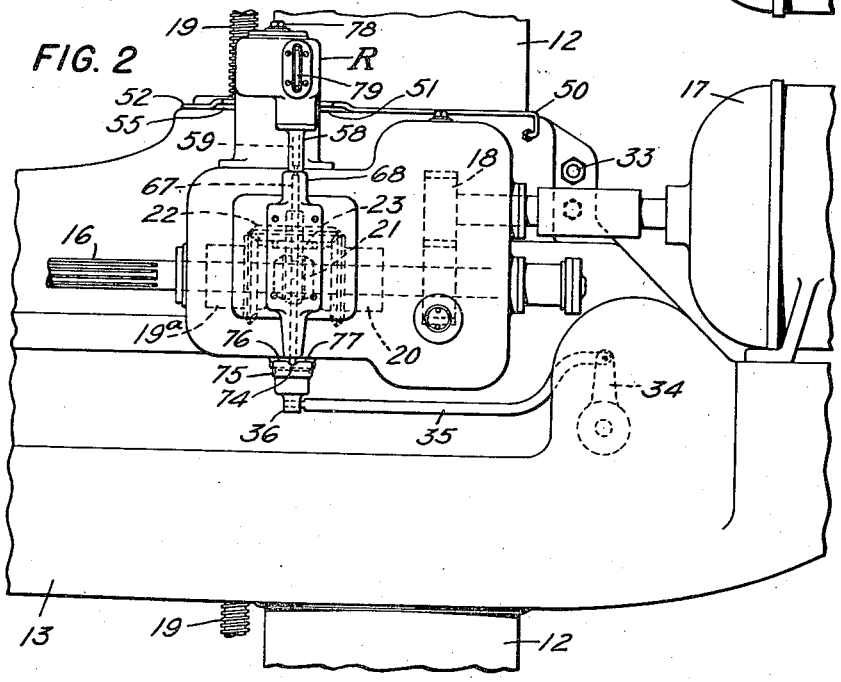
INVENTOR
Lawrence L. Schauer
BY
Albert F. Nathan
ATTORNEY

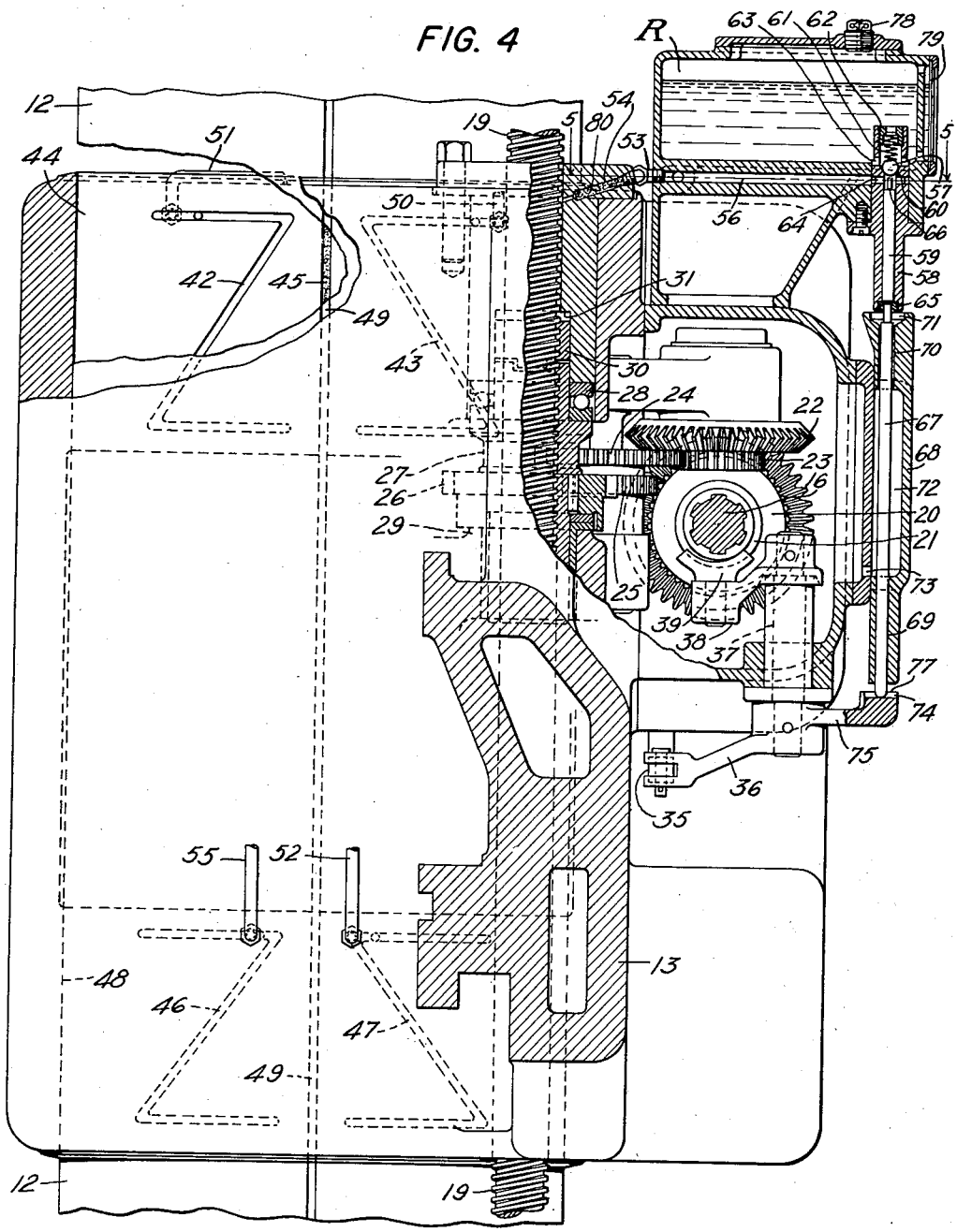

July 30, 1940.   L. L. SCHAUER   2,209,939
AUTOMATICALLY-CONTROLLED GRAVITY OILER
Filed July 26, 1938   4 Sheets-Sheet 4

INVENTOR
Lawrence L. Schauer
BY
Albert F. Nathan
ATTORNEY

Patented July 30, 1940

2,209,939

UNITED STATES PATENT OFFICE 2,209,939

AUTOMATICALLY CONTROLLED GRAVITY OILER

Lawrence Lee Schauer, Wyoming, Ohio, assignor to The Cincinnati Bickford Tool Company, Cincinnati, Ohio, a corporation of Ohio Application July 26, 1938, Serial No. 221,302

7 Claims. (Cl. 184—6)

The present invention relates to automatic lubricating devices for machine tools and more particularly to a lubricating device for column girdling portions of drilling machines.

In my prior application, Serial No. 202,861, of which this application is a continuation in part, there is disclosed a radial drilling machine in which the column and girdle portions of the arm are automatically lubricated by a system incorporating a pressure device which requires an initial setting or preloading to be effective. The present invention is concerned with a lubricating device that does not require a preloading operation but which is instantly operative to feed lubricating material to the bearing surfaces or other critical regions of the machine concurrently with the starting of relative movement between the parts.

A primary aim of the invention is to render available a simplified structure requiring a minimum number of parts, which, when applied to a new machine or to an existing machine, will efficiently perform the service of automatically supplying lubricant when the parts are in motion and to shut off the supply when the motion stops. Consequential savings in lubricating material is by this invention effected in addition to the savings realized by the certainty of adequate lubrication at critical regions.

A further aim of the invention is to avoid complex organizations that are difficult to maintain in proper working order, and to provide a lubricating system that may be relatively inexpensively manufactured and applied to machines and connected to lubricate critical parts automatically upon the shifting of a clutch or other control mechanism by means of which the parts are set in motion.

Still another objective of the invention is to provide an automatic lubricating system for machine tools predicated upon the gravity feed principle having as an essential characteristic, however, the feature of automatic flow control whereby lubricating material is supplied when the machine elements are in motion and definitely shut off when the machine parts are idle.

As an additional improvement the invention aims to provide a semi-automatic control for the oiler preferably located within the lubricant reservoir so as to be tamper proof and also to exclude entry of foreign matter which will automatically operate to close off the flow of lubricant to the bearing surfaces upon the return of the control instrumentality to its neutral position and thereafter maintain the flow definitely closed off throughout the period the machine, or those particular parts thereof, is standing idle.

The invention further proposes a compactly arranged oiling system in which the immediate control means therefor is fully enclosed by the main casing of the reservoir and all operating parts connected therewith enclosed in supplemental casings that may be of such configuration and size as warranted by the particular structure or nature of the machine to which the gravity system is applied.

The invention is particularly adaptable to machines of the radial drill type herein disclosed for the reason that the arm elevating means and portions of the arm that bear against the upright post or column are, in the first instance, difficult to lubricate and, secondly, because of the tremendous pressures between the surface of the elevating screw and nut and the surfaces of the post and arm girdle, any lubricant that has been applied is wiped practically completely off upon the first pass of the arm. Succeeding movements of the arm are, consequently effected without adequate lubrication and undue wear of the parts result.

With the aid of the present invention, however, the foregoing danger does not exist for the reason that a single filling of the reservoir will last over a relatively long period. Its operation is entirely automatic, the moment the operator moves the control lever to raise or lower the arm the present gravity oiler automatically feeds a copious supply of lubricant to the bearing portions and continues so supplying until relative movement between the parts ceases. Accordingly, the operator of a machine so equipped, is relieved of the task of manual oiling and the untidy and hazardous effects occasioned by swabbing the column and elevating screw are completely eliminated. Moreover, with the present arrangement, the attendant is assured at all times that the parts are adequately lubricated when in motion and that no waste or dripping of oil occurs when the machine is at rest.

In carrying out the ends in view, it is proposed to construct a box-like reservoir having a bottom wall transversely bored to receive the required number of feed lines. All of the separate bores for the feed lines communicate with a main supply bore which in turn communicates with the interior of the reservoir through the medium of a normally closed spring valve. A push bar underlying the valve is provided for actuating the valve to an open position whereupon lubricant may flow from the reservoir through the various channels and conduits to the several regions requiring lubricant. To effect operation of the valve to an open position, the push bar is, in this instance, adapted to be actuated by the arm elevating mechanism whenever the control is moved from neutral to an effective position. Thus whenever the movable parts of the machine are in motion, they are supplied with lubricant. When the clutch mechanism is returned to neutral, to stop the relative movement, the valve automatically closes off the supply. The mechanism just referred to may be located where desired on the machine, the only restriction being that the reservoir is to be at a position higher than any point or bearing on the machine that is intended to receive lubricant therefrom.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 2 is a rear view of the column portions of the arm illustrating the location of the gravity oiler with respect to the arm elevating mechanism and its control.

Fig. 3 is a plan view of the mechanism illustrated in Fig. 2.

Fig. 4 is a vertical section through the oiler and its actuating mechanism showing more clearly the oiling channels for the arm girdle and arm elevating mechanism.

Figure 1:
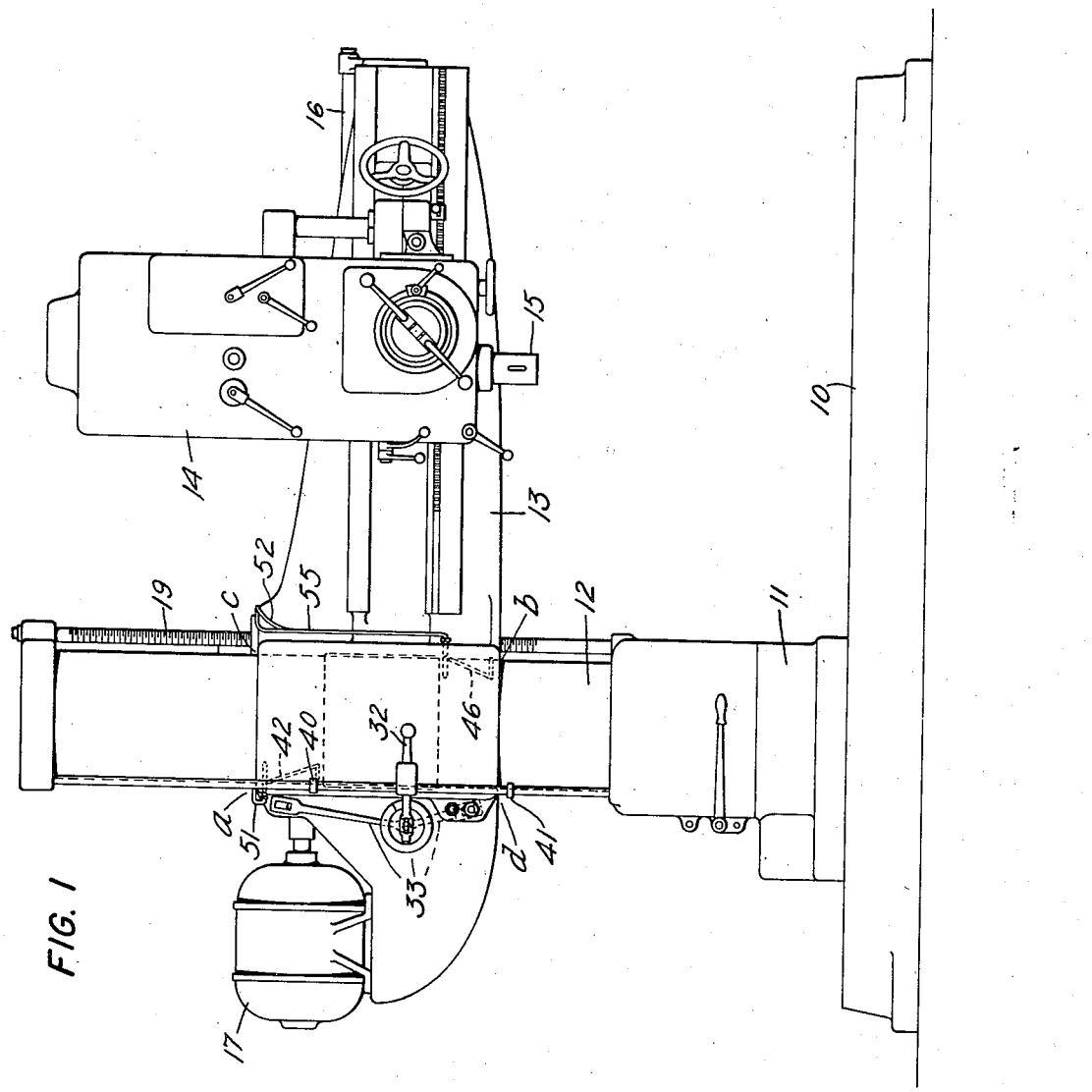
Figure 1 is a front view of a radial drill embodying this invention.
Figure 5:
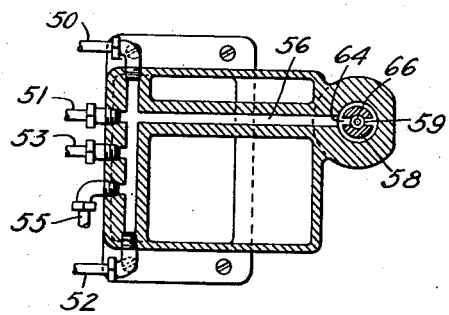
Fig. 5 is a horizontal section taken along lines 5—5 of Fig. 4, through the oiler.
Figure 6:
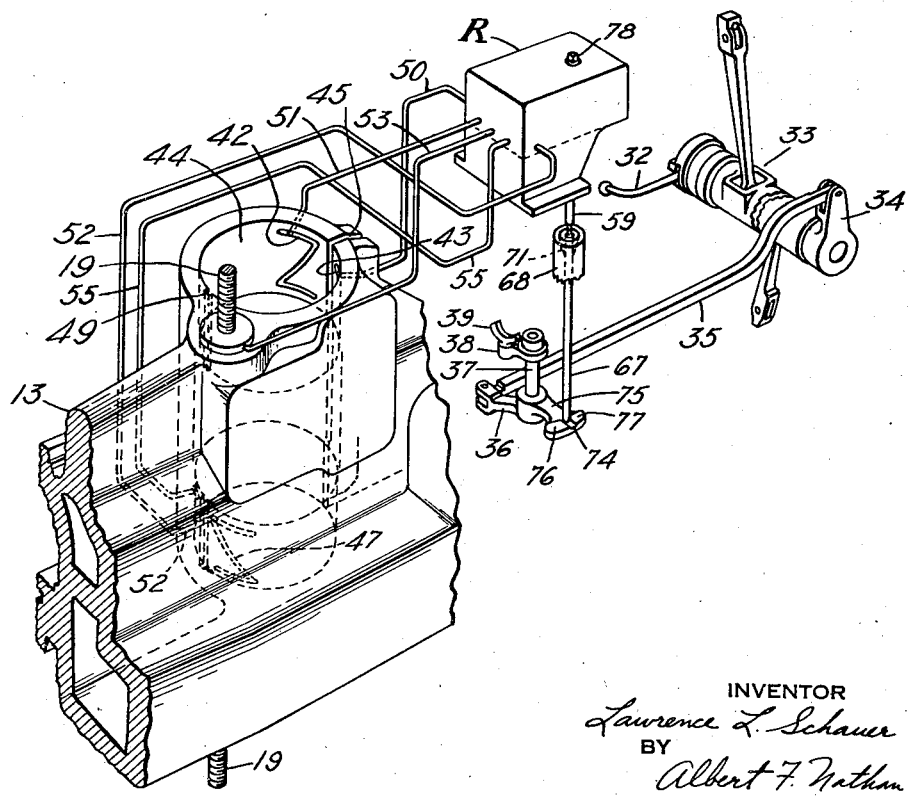
Fig. 6 is a schematic diagram of a typical system and its control.

Referring more particularly to Fig. 1, the machine illustrated comprises essentially a base 10, a column 11 upon which is rotatably mounted a sleeve 12 that supports a laterally extending arm 13. The arm 13 carries the tool head 14 in which is journaled the usual tool spindle 15 powered from the arm shaft 16 and motor 17. A pair of change gears 18 transmit the motion of the motor to the arm shaft at the rate suitable for the particular class of drill.

The arm 13 and all parts carried thereby is arranged to be raised and lowered on the column sleeve by means of the elevating screw and nut mechanism indicated generally as 19 and 27, illustrated more clearly in Figs. 2, 3 and 4. With reference to Fig. 4 the power from the arm shaft 16 may flow through either of the bevel gear clutches 19a and 20, arranged at opposite sides of a clutch actuating spool 21, to the reversible bevel gear 22 journaled in the frame of the machine. A small spur gear 23 transmits the motion of bevel gear 22 to an idler gear unit 24, 25, which in turn transmits the motion to a gear 26 that is keyed or otherwise secured to the main elevating nut 27.

The gear and nut 26 and 27 are maintained against axial shifting movement relative to the arm by means of thrust bearings 28 and 29. The elevating screw 19 has a threaded engagement with the nut 27 and is secured at its ends against rotation in the cap and bell portions of the rotatable sleeve 12 of the machine. Consequently, rotation of the elevating nut 27 causes the arm to be translated up or down on the column, depending, of course, upon which of the clutches 19a or 20 has been rendered effective.

A safety nut 30 keyed to the main nut 27 is provided to catch and prevent the arm from falling should the threads of the main nut become stripped. Normally, the safety nut carries no load whatsoever but merely rotates with the main nut 27. However, should the threads of the main nut cease to carry the load, the safety nut 30 shoulders against the seat 31 and prevents the arm from falling.

In the present embodiment the control for the elevating clutches 19a and 20 is effected through the medium of a hand lever 32 located at the front of the machine. The lever 32 also operates the arm clamping mechanism indicated as 33, as described and explained more fully in the patent to Klausmeyer No. 1,708,420. However, for the present purpose it will suffice to explain that the lever 32 is also employed to oscillate a clutch shifting lever 34 at the back of the machine. The lever 34 connects with a link 35 which in turn connects with a lever 36 mounted at the lower end of a clutch shifting shaft 37. The shaft 37 projects through the housing of the machine and carries at its inner end a lever 38 to which is mounted the clutch shifting spool fork 39 that partly encircles the spool 21. Through the mechanism just described the arm may be unclamped from the column, elevated or lowered as the case may be and then reclamped solely by the lever 32. Upper and lower fixed limit stops 40, 41 are provided for automatically returning the control lever to neutral should the operator inadvertently attempt to translate the arm in either direction beyond its normal extremes of movement.

It will be evident from an inspection of Fig. 1 that the weight and lever action of the lateral arm 13 causes a very definite binding action of the arm girdle against the column at the regions marked $a$ and $b$ and a corresponding clearance or slack at the regions $c$ and $d$ during a process of raising or lowering, and it is the regions $a$ and $b$ that require ample lubrication during such movements. To that end Z-shaped oil grooves 42 and 43 are provided in the upper bearing surface 44 of the arm girdle, one set of grooves being located near each of the ends of the portions of the arm girdle adjacent the split 45. Corresponding oil grooves 46 and 47 are provided in the lower bearing portion 48 of the arm girdle at the opposite side and which are located on each side of the key or spline 49. The key 49 fits a longitudinal groove in the column sleeve 12 and prevents relative angular movement between the arm and sleeve. The upper pair of Z-shaped channels are connected by lines 50 and 51, whereas, the lower Z-shaped grooves are connected by lines 52 and 55.

In like manner the elevating screw mechanism is supplied with lubricant through conduits 54 and oil line 53. By reason of the fact that the greatest wear and more severe action on the threads of a nut takes place when the arm is being elevated, it is preferred to locate the oil connection 54 so as to feed oil to the screw just in advance of the nut.

The oil lines 50, 51, 52, 53, and 55 that lead to the reservoir form branches of a common supply channel 56. At the inlet end of the channel 56 a ball check valve 57 is provided which controls the flow of fluid from the reservoir to the various branch lines.

A preferred construction of the valve and its actuator is illustrated in Fig. 4 and comprises a tubular member 58 that fits closely to a bore formed in the bottom wall of the reservoir. The member 58 has its lower end bored to receive a push bar 59 and its upper end bored slightly larger to provide a valve seat 60 and the enclosure for a valve closing spring 61 and its retaining means 62. Transverse ports 63 and 64 located above and below the valve seat and communicating respectively with the reservoir R and the main supply channel 56, are also provided in the tubular member 58. In the position of the parts illustrated in Fig. 4 the valve is closed and seals off the flow between the reservoir and the main supply channel 56. The push bar 59 has a free but close fit in a relatively long bearing and is retained in the tube by means of a hollow plug 65 screwed into the lower end. The upper end of the push bar is reduced as at 66 so as to provide an ample flow passage for the lubricant between the ports 63 and 64 when the valve is lifted off its seat.

The valve 57 may be moved off its seat by shifting the bar 59 axially, in the present instance, this may be effected by a second bar 67 arranged coaxial therewith and abutting its end. The bar 67 is slidably mounted in upper and lower bearing portions of a bracket 68 secured to the side of the machine. The lower bearing 69 is a relatively close fit for the shaft 67 while the upper bearing 70 fits the shaft rather loosely and is funnel shaped at its upper end. Owing to the length of the push bar 59 and the nicety of its fit in the central bore of the tubular member 58, very little leakage of lubricant will take place along the sides thereof. Any leakage that does occur, however, will be caught by the funnel 71 of the bracket 68, conveyed through the loose bearing 70 thereof to the space 72, thence through a port 73 adjacent the upper end of the lower bearing to the interior of the machine.

The bar 67 has its lower end rounded and normally seats in a cam groove 74 provided in the upper face of a lever 75 which in the present embodiment of the invention is secured to the clutch spool shifting shaft 37. If desired, the lever 75 and the lever 36 may be made as separate elements. As will be seen from Figs. 2 and 3, the upper face of the lever 75 is flared laterally and provides two lands 76 and 77 at opposite sides of the cam groove 74. Each of these lands are of sufficient length in an arcuate direction to support the end of the push rod 67 is either extreme position of the clutch shifting fork. The cam groove 74 between the lands is of such depth and width as to allow the shaft 67 to drop therein and to cause a corresponding dropping of the push bar 59 in a prompt closing of the valve 57 when the elevating clutch occupies a neutral position.

The device operates as follows: After the oiler has been mounted upon the machine and the various oil connections made therewith, the operator will fill the reservoir R by removing a vented plug 78 until the proper level is reached as seen by the window 79. So long as the elevating clutch remains in neutral the spring pressed valve 57 remains on its seat and closes off the flow of fluid to the feed lines. However, the operation of lever 32 to one of its effective positions whereby one of the clutches 19 and 20 is placed in operation and the arm is put in motion, automatically causes a lateral swinging of the lever 75. The cam groove 74 therein forces the rod 67 upwardly which in turn actuates the push bar 59 and positively lifts the valve 57 off of its seat against the action of the spring 61. This opening of the valve establishes communication between the ports 63 and 64 and a flow of oil takes place from the reservoir R to line 56 and thence to feed lines 50, 51, 52, 53, and 55, leading to the several critical regions of the machine that require lubrication.

To prevent too free a flow of lubricating medium through the lines 50, 51, 52, 53, and 55 the several lines have wicks 80 inserted in their extremities which permits a seepage of oil therethrough to the oil grooves and bearing surfaces, yet prevents the free escape and guards against the hazardous condition that would follow if the lubricant were to be allowed to drip more or less freely from the machine to the floor of the work shop. Once the system of oil lines has been filled with oil, the restoration of the arm elevationg clutch to neutral simultaneously brings about the automatic closing of the lubricant supply valve. The closing of the valve, it will be seen, will prevent further flow of oil by gravity through the various lines by reason of the fact that any flow subsequent to the closing of the valve tends to produce vacuum in the main supply line 56 which will immediately stop such further flow. In consequence, during periods that the mechanism is idle, little or no flow takes place in the oil lines and needless dripping and waste of oil is thereby prevented.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. A lubricating device for the arm and column bearing surfaces of a radial drill combining a lubricant reservoir mounted on the drill arm; normally idle arm elevating and lowering mechanism including a two-way movable clutch element; a system of feed lines leading from the reservoir to the bearing surfaces to be lubricated including a line to the arm elevating mechanism; a common supply conduit for said system of lines; a normally closed valve in said common conduit, including a casing member, a bar underlying said valve adapted when actuated to open said valve; said casing member being provided with a fluid entering port on the reservoir side of said valve and a fluid discharge port on the side of said valve leading to said system of feed lines; a manually operable control lever connected with said clutch element for shifting same thereby to render said arm elevating mechanism effective selectively to raise or to lower the arm on the column; means also operatively connecting the said arm elevating control lever with said bar for shifting said bar to valve open position thereby to permit a flow of lubricating material from said reservoir to said common supply conduit and to said surfaces during the movement of the arm on said column; and means to close the said valve coincidently with the stopping of arm movement.

2. A lubricating device for the arm and column bearing surfaces of a radial drill combining a lubricant reservoir mounted on the drill arm; normally idle arm elevating and lowering mechanism including a two-way shiftable clutch spool; a system of feed lines leading from the reservoir to the bearing surfaces to be lubricated including a line to the arm elevating mechanism; a common supply conduit for said system of lines; a normally closed valve in said conduit; a manually operable reversely movable control lever connected with said clutch spool for actuating same thereby to render said arm elevating mechanism effective selectively to raise or to lower the arm on the column; and means also connecting the arm elevating control lever with said valve for actuating said valve to an open position and thereby permit a flow of lubricating material from said reservoir to said common supply conduit simultaneously with the movement of the said clutch spool to either one of its effective positions and irrespective of the direction of movement of the arm on the column resulting therefrom.

3. A gravity oiler adapted to supply lubricant to the column bearing surfaces of a radial drill only when the arm is in motion comprising an arm elevating and lowering control lever; a lubricant reservoir carried by the arm and a connection therefrom to said bearing surfaces; a normally closed ball check valve in said connection; connections between said control lever and said valve for opening said check valve to permit a gravity flow of lubricating medium from the reservoir to said bearing surfaces coincident with the movement of the lever to a position effective either to raise the arm or to lower the arm; and spring means acting upon the ball of said valve for moving the ball to valve closed position upon the return of said manual lever to its initial position thereby stopping the flow of lubricant from said reservoir simultaneously with cessation of arm movement.

4. An automatic oiler for supplying lubricant to exposed bearing surfaces of the column of a radial drill only when the arm of the drill is in motion thereon, said radial dill having power means for effecting movement of the arm on the column selectively in reverse directions and a manually operable control element therefor, said element having a neutral and a forward and a reverse position, combining a lubricant reservoir carried by the arm of the radial drill and situated above the surface to be lubricated. a lubricant feed line between the reservoir and the bearing surface for conveying lubricating material from the former to the latter by gravity; a manually operated valve in said line, connections between said valve and said manual control element operative to open the valve upon a shifting of said control element from its neutral to either of its effective positions; and means operative to close said valve upon the return of said control element to its neutral position.

5. A machine tool combining a power operated reversing mechanism and an element to be propelled thereby selectively in reverse directions, means for feeding lubricating material by gravity to the bearing surfaces of said element only when it is being propelled in either of said directions of movement comprising a reservoir of lubricating material and a feed conduit therefrom to the bearing surfaces of the said element to be propelled, a normally closed valve in said conduit; a hand lever for actuating said reversing mechanism to a position effective to propel said element selectively in reverse directions and for manually opening said valve coincidently therewith; and separate means to close said valve coincidently with the return of said manual lever to its initial position.

6. In a machine tool having a power operated reversing mechanism and an element to be propelled thereby selectively in reverse directions, the combination of means for lubricating the bearing surfaces of the said element only when it is being propelled in either of its two directions of movement comprising a manually operated lever selectively movable in opposite directions from a neutral position for rendering said reversing mechanism effective selectively in reverse directions, a reservoir of lubricating material and a feed conduit therefrom to the bearing surfaces of the said element to be propelled, a normally closed valve in said conduit; and connections between said valve and said manual lever for opening said valve upon movement of the lever to either one of its effective positions; and additional means to close said valve coincidently with the return of said manual lever to its neutral position.

7. An automatic oiler for supplying lubricant to exposed bearing surfaces of intermittently relatively movable parts of a machine tool only when said parts are in motion, said machine tool having power means for effecting such relative movement including a reversing mechanism and a manually operable control lever movable selectively in reverse directions for actuating said reversing mechanism, said lever having a neutral and a forward and a reverse position, combining a lubricant reservoir on one of said members and situated above the surfaces to be lubricated, a supply line between the reservoir and the bearing surface for conveying lubricating material from the former to the latter by gravity; a manually operated valve in said line, connections between said valve and said manual control lever operative to open the said valve upon a manual shifting of said control lever from its neutral to either of its forward or reverse effective positions; and means operative to close said valve coincidently with the return of said control lever to its neutral position.

LAWRENCE LEE SCHAUER.